G. T. ASHLEY.
ELECTRICAL CONTROLLING AND REGULATING APPARATUS.
APPLICATION FILED DEC. 13, 1909.
1,077,451.
Patented Nov. 4, 1913.
3 SHEETS—SHEET 2.
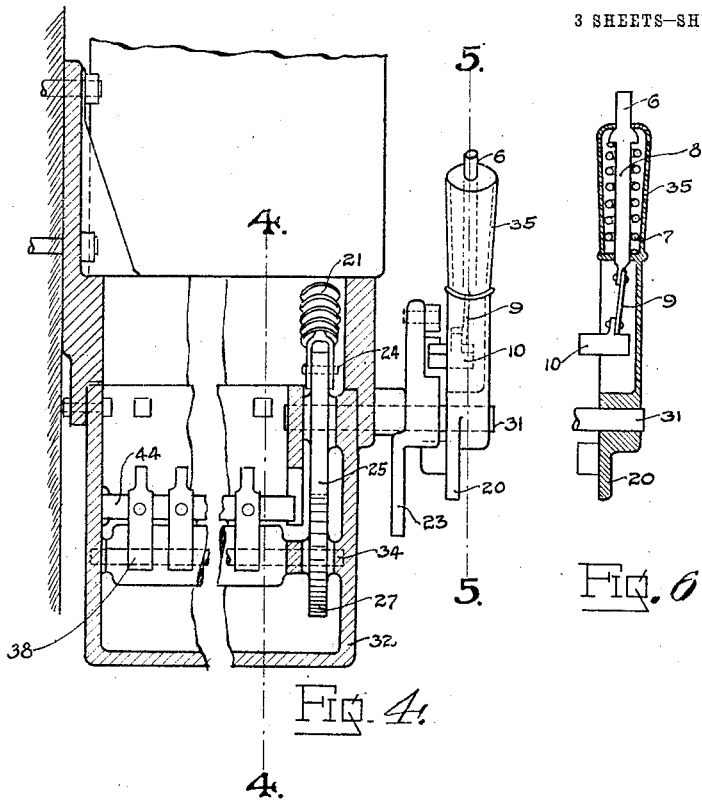
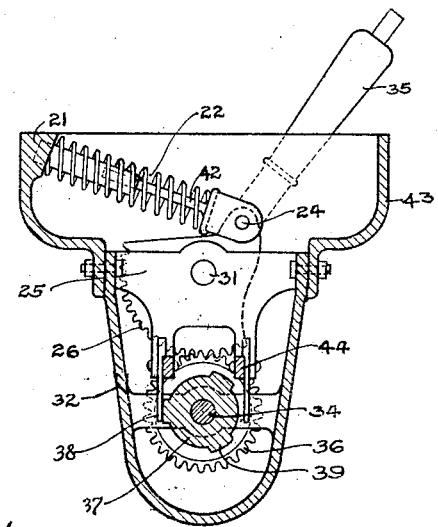

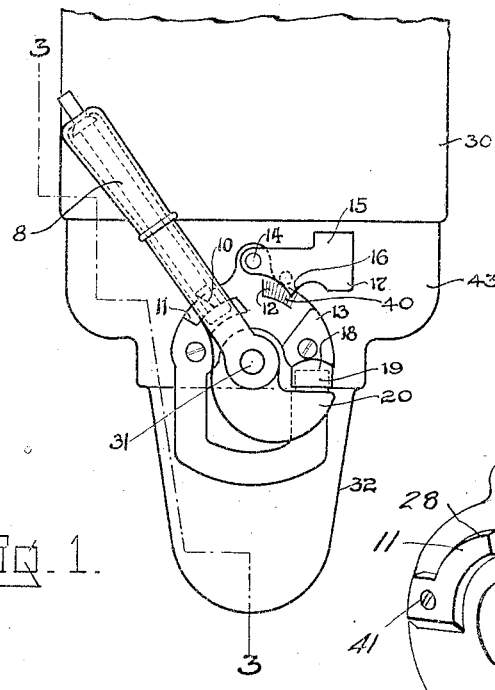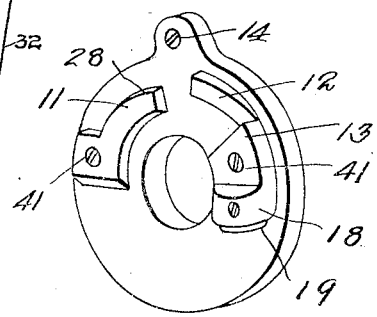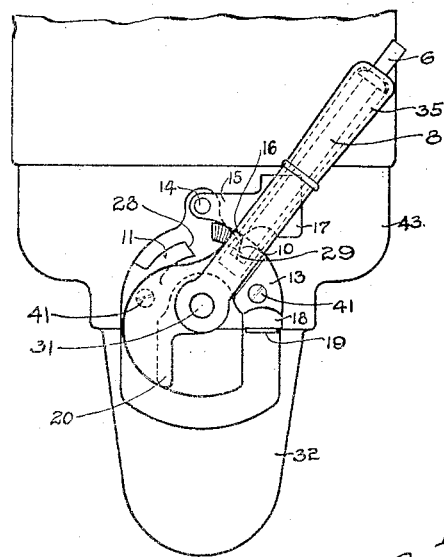

G. T. ASHLEY.
ELECTRICAL CONTROLLING AND REGULATING APPARATUS.
APPLICATION FILED DEC. 13, 1909.
1,077,451.
Patented Nov. 4, 1913.
3 SHEETS—SHEET 3.
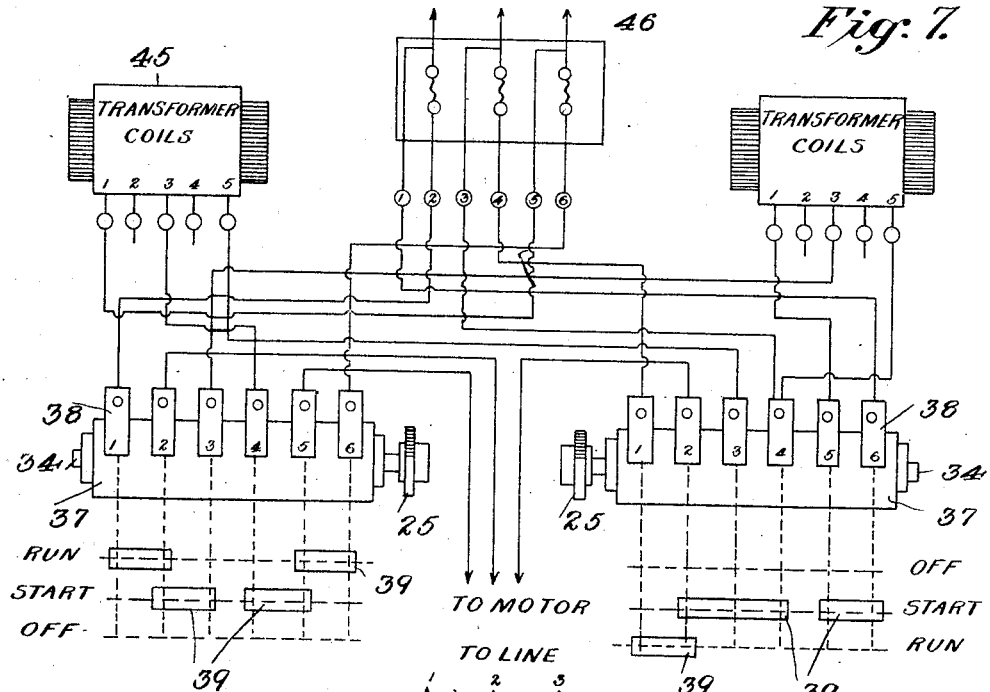
Fig. 7.
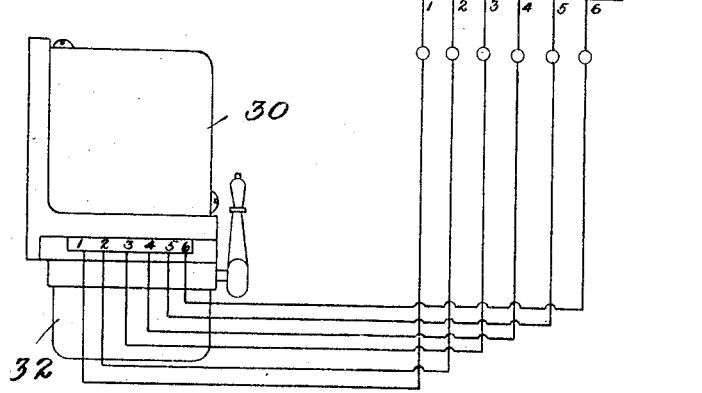
Fig. 8.
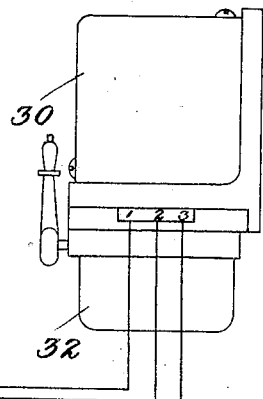
Fig. 9.
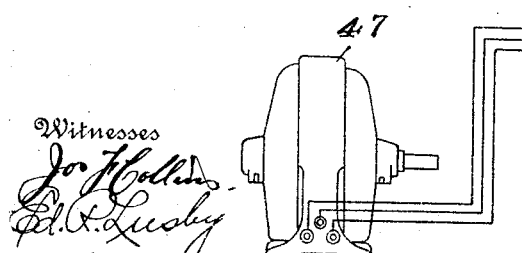
Witnesses
Inventor
George T. Ashley
By
Attorney

UNITED STATES PATENT OFFICE.

GEORGE T. ASHLEY, OF SANTA MONICA, CALIFORNIA, ASSIGNOR TO FAIRBANKS-MORSE ELECTRICAL MANUFACTURING COMPANY, OF INDIANAPOLIS, INDIANA, A CORPORATION OF INDIANA.

ELECTRICAL CONTROLLING AND REGULATING APPARATUS.

1,077,451.   Specification of Letters Patent.   Patented Nov. 4, 1913.

Application filed December 13, 1909. Serial No. 532,968.

*To all whom it may concern:*

Be it known that I, GEORGE T. ASHLEY, of the county of Marion, in the State of Indiana, now residing at Santa Monica, in the county of Los Angeles, State of California, have invented certain new and useful Improvements in Electrical Controlling and Regulating Apparatus, of which the following is a full, clear, and exact description, such as will enable others skilled in the art to make and use the same.

My invention consists in the construction and arrangements of parts hereinafter described, and particularly pointed out in the claims.

I have shown in the drawings, and in the following specification I will describe my invention by illustrating its operation in connection with an auto-starter for which it is primarily designed, although it is obvious its use is not limited to auto-starters alone.

Auto-starters and auto-transformers have been used heretofore in starting induction motors, but owing to the fact that they have been easily mishandled by careless or inattentive operators, their use has not been as extensive as it would otherwise have been.

Most electrical apparatus effecting a safe and certain starting of electric motors, and particularly auto-starters, are constructed so as to have three positions. An "off" position, a "start" position and a "run" position. In the "off" position the auto-starter is not connected with the main line. In the "start" position the motor is connected to the line through the auto transformer and the coils of the auto transformer reduce the rush of current from the line during the starting and acceleration of the motor. The "run" position is the position of normal running. In this position the auto-transformer coils are cut out and the motor is connected directly to the line.

Among difficulties heretofore found with those auto-starters used, the following may be mentioned, namely; they could be left on the "start" position indefinitely, whereas after a proper interval of time they should be thrown to the "run" position; they could be thrown from the "off" position to the "run" position without being arrested at the "start" position and they were often left at intermediate positions.

My invention when applied to auto-starters overcomes these and other defects, and gives an auto-starter that cannot be left by the operator in the "start" position or any other position except the "off" or "run" position, and that cannot be thrown directly from the "off" to the "run" position without stopping at the "start" position temporarily. It also insures a quick break in throwing from the "run" position to the "off" position.

In describing the apparatus employed and shown in the drawings hereto attached, and described in the specification, I do not limit my invention to the precise form, shape or construction of the apparatus shown, or the several parts thereof, as various alterations may be made without changing the scope of my invention. It is also manifest that certain of the arrangements shown herein may be advantageously used in switches, motors and other electrical apparatus, as well as in auto-starters, and, therefore, I do not limit myself to the use of my invention in auto-starters alone.

Figure 1 is a front view showing the auto-starter in the "off" position. Fig. 2 is a view showing the auto-starter in the "run" position. Fig. 3 is a perspective view of the small casting shown in Figs. 1 and 2, partly concealed by the handle but here shown with the handle and shaft removed. Fig. 4 is a cross-sectional view on line 3—3 of Fig. 1. Fig. 5 shows a cross-sectional view on line 4—4 of Fig. 3. Fig. 6 shows a cross-sectional view on line 5—5 of Fig. 3. Fig. 7 shows my invention utilized in an auto-transformer and illustrating a manner in which such auto-transformer may be connected with a motor in the "off," "start" and "run" positions. Fig. 8 illustrates a connection of my apparatus with the line and Fig. 9 shows a motor in circuit with my apparatus.

In the figures of the drawings, 30 shows the case containing one or more transformers; 43 shows the switch frame; 32 shows the oil well or pan, which is attached to the switch frame in any usual way; 31 is a shaft to which is attached the handle 35. The shaft 31 is connected with a geared quadrant 25, which meshes with the teeth of the pinion 27. This pinion is upon shaft 34, on which also there is mounted a movable contact device 37 here shown, for convenience as a drum. On this latter are contact plates or points which by the movement of the handle successively connects the motor with the auto-transformer and the line through the fingers 38, first in the "start" position and then in the "run" position connect the motor directly to the line. These connections are changed from the position suitable for starting to the position suitable for running by merely moving the handle which through the gearing turns the contact device so that the aforesaid different electrical connections are made and broken. The handle 35 has a depressible button indicated at 6.

7 is a spiral spring which opposes the pressing down of button 6 and catch 10. Within the spiral spring is a rod 8 and connecting the rod 8 to catch 10 is a spring-rod 9. The catch shown at 10 has a sloping face, indicated at 29, to prevent the catch from engaging with lug 11, and lug 11 has likewise its end with an inclined plane indicated at 28. 12 is a projection which necessitates the radial depression of catch 10 in its movement toward the "running" position.

40 is an inclined plane on the projection 12 whereby the catch 10 in passing from the "run" position to the "off" position rises over such ascending surface and then drops from such projection into the channel immediately above lug 11.

13 is a stop, 14 a pivot; 15 a gravity dog, 16 a tooth therein; 17 is an impacting or contacting face thereon; 18 is a bumper seat which is here shown as part of the stop 13. Within this bumper seat is inserted a rubber bumper 19.

20 is an arm which is part of the handle 35. In throwing from the "run" to the "off" position the recoil is taken up by the arm striking on the rubber bumper.

42 is a rod. 21 is a boss. 22 is a spiral spring. 23 as shown is a small casting which is attached to the exterior of the switch frame 43 by screws 41. This small casting is used primarily for economy, and it is evident that in place of this small casting, the switch frame may be cast in one piece with these various lugs and projections thereon.

24 is a fulcrum connecting the quadrant 25 with spring 22. The gearing of the quadrant 25 is shown at 26.

44 are connection blocks from which extend the fingers 38 by which electrical connection is made with contact plates or points 39 on the contact device 37, first for the "starting" position and then for the "running" position. In Fig. 7 the fingers 38 are numbered in small numerals as well as the leads to facilitate an understanding of the operation of my apparatus. Many other arrangements of circuits may be made. The fuse-blocks shown in Figs. 7 and 8 are designated 46 and the motor in Fig. 9 is designated 47.

The operation of my invention which I shall illustrate as used in an auto-starter, is as follows: When the auto-starter is in the "off" position as shown in Fig. 1, the operator grasps the handle 35 and moves it to the right until it is in a vertical position. At this point its further motion to the right is arrested by the projection 12. In order to proceed further, it is then necessary for the operator to push down the button 6, which button on being pressed down in turn depresses the rod 8 and the spring-rod 9, and moves the catch 10 out of engagement with said projection 12. The lug 11 serves to prevent the operator from pressing down the button, until the handle has reached the "starting" position. Otherwise an operator could, in grasping the handle, at the same time press down the button and in one quick throw move the handle from the "off" to the "run" position. While the handle is in the vertical or "start" position, the motor and the coil or coils of the auto-transformer are connected.

On account of the compression of spring 22 and since the end 28 of lug 11 is an inclined plane engaging the sloping face 29 on catch 10, it is impossible for the operator to leave the handle in any position except the "off" or "run" positions. It will, therefore, be seen that the operator cannot release his hold on the handle at any time prior to the tooth 16 engaging catch 10, or in other words, until the handle has been thrown over to the "run" position, or the position of normal operation as shown in Fig. 2, without the handle swinging back to the "off" position.

When the motor has attained the proper speed the operator will continue the movement of the handle and swing it over from the "start" to the "run" position. On reaching this position the tooth 16 of the gravity dog 15 engages catch 10 as shown in Fig. 2. The gravity dog is shown in Figs. 1 and 2 as swinging on pivot 14, which pivot is attached to the casting 23, which casting, in turn, is attached to the switch frame in any usual manner. The stop 13 is used to prevent the further movement of the handle 35 to the right and at the same time it is here used to prevent the gravity dog 15 from dropping below the position necessary to engage catch 10. When it is desired to throw from the "run" position to the "off" position, the gravity dog 15 engaging catch 10 should be raised, thereby releasing the handle, which owing to the pressure of the opposing spring 22, then under its greatest compression, swings back quickly to the "off" position, the catch 10 rises over the inclined plane of projection 12, compressing the spring rod 9 and drops into the channel above lug 11. By depressing the button 6 the handle may also be released, but this does not give as satisfactory a breaking of the electrical connections. The recoil in throwing from the "run" to the "off" position is taken up by the arm 20 striking on the bumper 19.

Any sort of a bumper may be used that will take up the recoil and prevent the castings from being fractured. The spring 22 which opposes the movement of the handle is connected with the geared quadrant shown in Figs. 4 and 5. This spring is arranged so as to insure a quick break in throwing from the "run" to the "off" position. The quadrant is used for convenience but any geared wheel or means of transmitting motion to the contact device may be used. The gear reduction from shaft 31 to shaft 34 is made not only to facilitate the submergence of said contacts in oil but also to increase the rapidity of the making and breaking of the connections.

I do not limit my invention to the using of two shafts, inasmuch as a number of gears might be used or all gears might be omitted, the handle in the last instance being connected directly to the drum. Likewise I do not limit the use of my invention to such apparatus in which the electrical connections are made and broken under oil.

Having thus described my invention, what I claim as new and desire to secure by Letters-Patent of the United States, is:—

1. The combination of a movable contact device, said device having thereon points for making electrical contacts, fingers connected to electric conductors, a handle, a catch temporarily arresting the movement of said handle at an intermediate position, a gravity dog having a tooth for holding the handle in running position, and means for throwing said handle back to its initial position without its stopping at any intermediate position, thereby making a quick break of said connections.

2. The combination of a movable contact device with electrical contact points or plates thereon, a handle operating said contact device, fingers connected to coils or conductors making different electrical connections successively through said contact points or plates, a spring opposing the motion of said handle, a catch on said handle, a projection which at an intermediate position prevents further movement of said handle until said catch is depressed, whereupon said handle may be thrown to its final position, a tooth which holds said handle in final position and yet admits of a quick release of the handle and its return to its initial position.

3. The combination of a handle attached to a movable contact device, contact points or plates on said contact device; coils or conductors which through fingers are differently connected with said contact points or plates by the turning of said contact device, a catch and a projection for temporarily arresting the turning of said handle, means for disengaging said catch and projection, a catch or tooth for holding said handle at its final position and means for quickly throwing back said handle to its initial position without its being stopped at any intermediate point.

4. The combination of a movable contact device, a handle turning said contact device through gearing, a catch arresting said handle at its intermediate position, a projection engaging said catch, means for disengaging said catch at its intermediate position, means for holding said handle at its final position, yet allowing a ready release of said handle, means for causing said handle to swing back without stopping to its initial position, substantially as described.

5. The combination of a movable contact device with electrical contact points or plates thereon, a handle connected with and turning said contact device so as to make different electrical connections through the contact points or plates on said contact device with fingers, fingers connected to coils or conductors; a spring opposing the forward turning of said handle, a catch, a projection, means for disengaging said catch and projection, a gravity dog, a tooth therein for causing a quick break of said electrical connections and return of the handle and said contact device to their initial positions, without stopping at any intermediate point.

6. The combination of a handle, a movable contact device, whereby in one position electrical connections of a certain character are obtained and in another or final position an electrical connection of another character is obtained, fingers making electrical connection with contact plates or points on said device, a catch in connection with said handle which prevents said handle from being thrown from its initial position to its final position, until said catch is removed out of engagement with a projection arresting said handle, a projection to engage said catch, a gravity dog with a tooth therein for engaging said catch so as to be readily released and means for preventing said handle from being left in any intermediate point, substantially as described.

7. The combination of a handle connected through gears to a movable contact device, a movable contact device, electrical contact points or plates thereon, fingers engaging successively first one set of said contacts and then another set of said contacts; a projection; a catch, which upon the handle reaching an intermediate position can be depressed out of engagement with said projection; a gravity dog with a tooth thereon to engage said catch at the final position of said handle, yet admitting of a quick release; a bumper taking up the recoil of said handle and means for causing a quick breaking of said connections and a return of said handle to its initial position, without stopping at any intermediate point, substantially as described.

8. The combination of a shaft having electrical contacts thereon, a handle turning said shaft to make different electrical connections through or by said contacts; a depressible catch operated by a button on said handle, a lug to prevent the depression of said catch until the handle is moved to its intermediate position, a projection arresting further motion of said handle at said intermediate position, until said catch is removed from engagement with said projection, a gravity dog with tooth therein to engage said catch when the handle is in final position, an impacting surface whereby said catch may be released from engagement with said gravity dog, a spring opposing said handle and causing said handle to be thrown back to its initial position and a bumper to take up the recoil when the handle is thus thrown back.

9. The combination of a shaft having electrical contact points or plates thereon, a handle turning said shaft to make different electrical connections through or by said contact points or plates, fingers which make electrical connection with said contact points or plates, coils or conductors connected to such fingers; a depressible catch operated by a button on said handle, a lug to prevent the depression of said catch until the handle is moved to its intermediate position, a projection arresting further motion of said handle at said intermediate position, until said catch is removed from engagement with said projection, a gravity dog with tooth therein to engage said catch when the handle is in final position, and means for causing a quick break of said electrical connections and the return of said shaft and contacts to their initial position.

10. The combination of a shaft, electrical contacts thereon, gears turning said shaft, a handle for turning said gears, fingers connected to coils or conductors and making different electrical connections through or by said contacts, a movable catch on said handle, a lug to prevent the moving of said catch until the handle has reached its intermediate position, a projection arresting further motion of said handle at said intermediate position, until said catch is removed from engagement with said projection, a gravity dog with tooth therein to engage said catch when the handle is in final position, an impacting surface or depressible button whereby said catch may be released from engagement with said gravity dog and said handle thrown back to its initial position.

11. The combination of a movable contact device, electrical contacts thereon, fingers making electrical connections with said contacts, the coil or coils of an auto-transformer with which said fingers are connected, a handle whereby said contact device may be rotated through gears, a catch for arresting said handle in the "start" position, which arresting-means, after an interval of time, may be removed by the operator to allow the handle to reach its final position, means for holding said handle at the "run" position and means for quickly releasing said handle from such engagement substantially as described.

12. In an auto-starter the combination of coils or conductors, a movable contact device with electrical contact points or plates thereon, fingers connected to said coils or conductors making different electrical connections with said points or plates, a spring opposing the motion of said handle, a projection, a catch, means for disengaging said catch and projection, whereupon said handle may be thrown to its final position, a lug preventing the depression of said catch until the handle has reached its intermediate position; a tooth which holds said handle in final position and yet admits of a quick release of said handle and a quick and uninterrupted return to the initial position of said handle and said contact device.

13. In an auto-starter the combination of a movable contact device with electrical contact points or plates thereon, a handle connected with and turning said contact device so as to make different electrical connections through the contact plates or points on said contact device, a spring opposing the turning of said handle, a projection which at an intermediate position arrests further turning of said handle, a catch which being depressed permits the handle to be thrown to its final position, means for holding said handle in final position and means which effect a quick break of the connections and return of said contact device to its initial position, without stopping at any intermediate point.

14. In an auto-starter the combination of a handle, electric circuits, a movable contact device whereby in one position electrical connections of a certain character are obtained and in another or final position other electrical connections are obtained, a catch in connection with said handle which prevents said handle from being thrown from its initial position to its final position, a projection opposing said catch at a predetermined intermediate position, a lug preventing said catch from being depressed until the handle reaches such intermediate position; a gravity dog with a tooth therein for engaging the aforesaid catch and retaining said handle in its final position and yet admitting of a ready release, and means for preventing said handle from stopping or being left on any intermediate point, substantially as described.

15. In an auto-starter the combination of a handle connected through gears to a movable contact device, a movable contact device having electrical contact points or plates thereon, a catch, a projection, means whereby said catch is depressed out of engagement with said projection, a lug preventing a depression or removal of said catch before reaching said intermediate position, a gravity dog with tooth therein to hold said handle in its final position, means for readily releasing said catch, means whereby said handle will without stopping on any intermediate point quickly return to its initial position and a bumper to absorb the recoil of the handle.

16. In an auto-starter the combination of electrical circuits and contact fingers, a movable contact device, electrical contacts on said contact device which effect different electrical connections with the coil or coils of said auto-starter through contact fingers, a handle which through gearing turns the contact device, a catch, a projection, a lug preventing the depression of said catch before it reaches said intermediate position, a tooth holding said handle at its final position and means for causing its ready and uninterrupted return to its initial position, substantially as described.

17. In an auto-starter, the combination of a movable contact device having electrical contacts mounted thereon, a handle turning said movable contact device to make different electrical connections through or by said contacts, fingers to connect said electrical contacts, a depressible catch operated by a button on said handle, a lug to prevent the depression of said catch until the handle is moved from its "off" position to its "start" position, a projection arresting further motion of said handle at said "start" position, means for holding said movable contact device in final position and means for quickly breaking these connections and returning to the initial position.

18. In an auto-starter the combination of a switch frame, a movable contact device, a handle arranged so as to turn said contact device, contact points or plates on said contact device, fingers for completing electrical connections by or through said points or plates, a projection arresting said handle at a predetermined intermediate position by engaging a catch on said handle, a lug preventing said catch from being depressed prior to reaching said intermediate position, a button on said handle to depress said catch and allow the handle thereby to be moved to its final position, a tooth or catch to hold said handle in its final position and means for securing a quick break of the electrical connections made through or by said contact plates or points and a quick and uninterrupted return of said handle to its initial position.

19. In an auto-starter, the combination of a switch frame, a movable contact device, a handle arranged so as to turn said contact device, contact points or plates on said device, fingers to which said points or plates make successive electrical connections, a projection which arrests said handle at its intermediate position by engaging a catch, means for removing said catch from engagement with said projection thereby permitting the handle to be moved to its final position, a lug preventing the depression of said catch until it reaches said intermediate position, a tooth or catch to hold said handle at its final position, and means for securing a quick break of the electrical connections through said contact plates and their quick and uninterrupted return to their initial position without stopping on or making connection at any intermediate position.

20. In an auto-starter, the combination of a movable contact device, contact points or plates on said contact device, a transformer coil, fingers in electrical connection therewith, which fingers bear upon and make electrical connection with different contact points or plates, a handle which through gears or a pinion turns said contact device, means for arresting said contact device temporarily at its "start" position, and means for readily breaking the connections at said final position and quickly and uninterruptedly returning said contact device to its initial position without stopping at any intermediate position.

21. In an auto-starter, the combination of a movable contact device, contact points or plates on said device, fingers which bear on different contact points or plates, a transformer coil in electrical connection with one or more of said fingers, a handle turning said contact device, means for temporarily arresting the turning of said handle at one or more predetermined intermediate positions, means for holding said handle at its final position and means for quickly throwing said handle back to its initial position without its stopping at any intermediate position.

22. In an auto-starter, a movable contact device, contact points or plates thereon, fingers which successively bear on different contact points or plates, and make electrical connection therewith, a transformer coil in electrical connection with one or more of said fingers, a handle turning said contact device, means for arresting the turning of said handle at a predetermined intermediate position for a proper interval of time, means for holding said handle at final position and means for quickly throwing said handle back to its initial position without its stopping at any intermediate position, substantially as described.

23. In an auto-starter, a movable contact device, contact points or plates on said device, fingers which successively bear on different contact points or plates and make electrical connection therewith, a transformer coil in electrical connection with one or more of said fingers; a handle turning said contact device, a catch arresting the movement of said handle at a predetermined intermediate position, a projection engaging said catch at said position, means for removing said catch from engagement with said projection whereby said handle may be moved to its final or "run" position, a lug preventing the moving of said catch out of engagement with said projection prior to the handle resting on the "start" position, a gravity dog and tooth therein to hold said handle at final position, yet permitting its ready release, means whereby on the release of said handle the contact plates may be thrown back to their initial position by a quick breaking of the electrical connections, caused by the throwing back of said handle from its final to its initial position, which handle stops at no intermediate position, an arm on said handle, a bumper which takes up the recoil of said handle on being struck by said arm, substantially as described.

GEORGE T. ASHLEY.

Witnesses:
  CHAS. A. TEGNER,
  PEARL TODD.